United States Patent Office 3,438,034
Patented Apr. 8, 1969

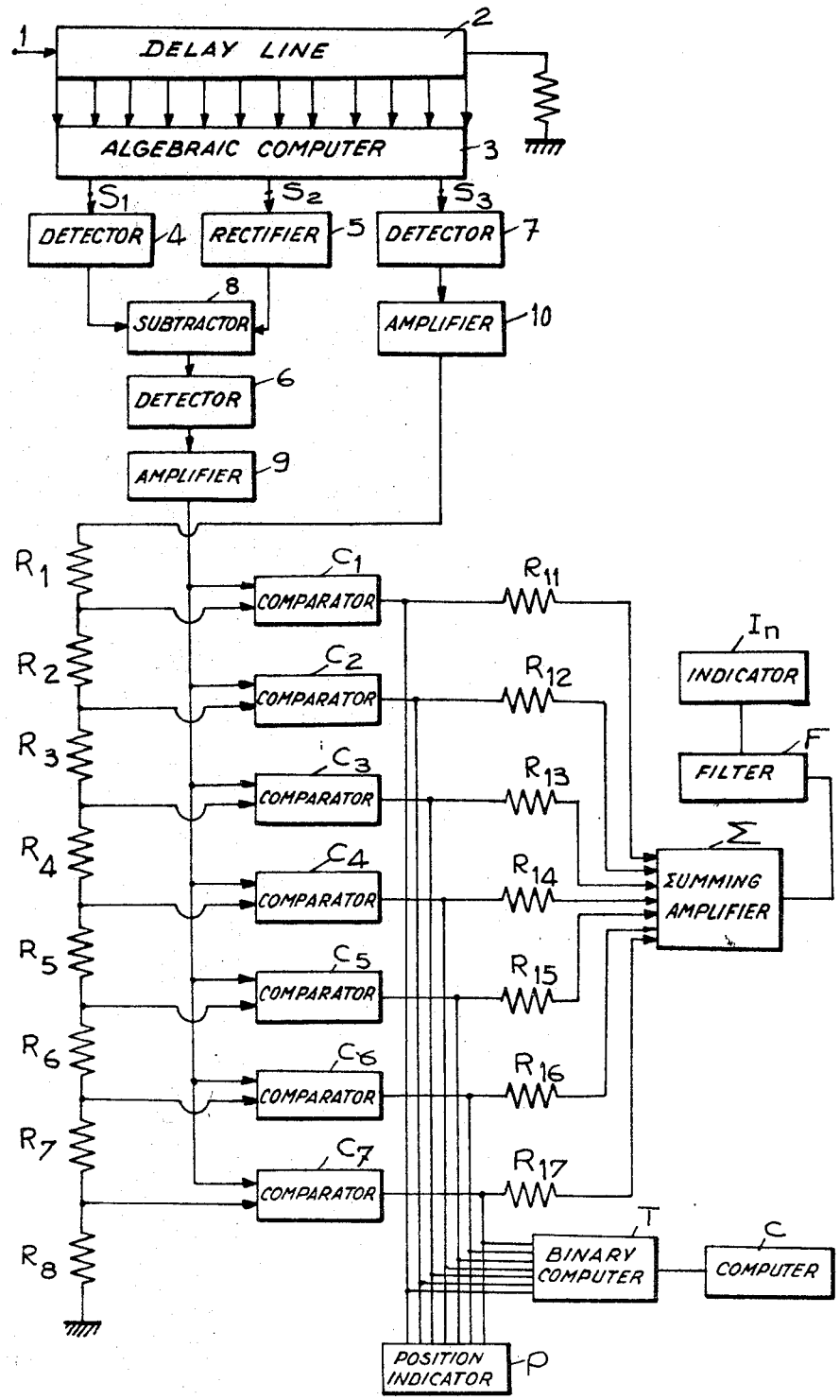

3,438,034
DEVICES FOR TREATING SIGNALS
Roland Carré and Jean Robert, Paris, France, assignors to CSF—Compagnie Generale de Telegraphie Sans Fil, a corporation of France
Filed May 9, 1968, Ser. No. 728,278
Claims priority, application France, May 10, 1967, 105,951
Int. Cl. G01s 7/28
U.S. Cl. 343—17.1                  2 Claims

ABSTRACT OF THE DISCLOSURE

An improvement to devices for treating pulse radar signals of the kind supplying a "purified" video signal and a threshold voltage resulting from a measurement of the average noise, consisting in the simultaneous formation of $n$ purified quantized signals by comparing the purified video signal with $n$ fractions of the threshold voltage.

---

The present invention relates to the treatment of the information at the video frequency in pulse radar receiver systems.

In the system described in the U.S. Patent No. 3,349,395, issued on an application filed by the applicants and assigned to the same assignee, the ultimate signal is obtained by substracting from a signal, from which long echoes have been eliminated, a signal which is proportional to the average noise. The proportionately coefficient is fixed once for all during each scanning period as a function of the maximum number of false alarms acceptable.

It followed therefrom that the probability of detecting a target was the smaller the higher the threshold thus determined. Now, certain so-called parasitic echos or "clutter" comprise, in addition to the D.C. component eliminated as long echos, puse-shaped components similar to noise. When such random components have peaks much higher than the average measured noise, a momentary blinding effect takes place, the operator observing the screen being prevented from detecting the targets.

It is an object of the invention to avoid this drawback.

According to the invention, there is provided a system for treating output signals of a pulse radar receiver comprising first means for eliminating from said signals echoes whose duration exceeds a predetermined duration, thus providing purified signals, second means for providing a first threshold voltage corresponding to the average noise accompanying said output signals, third means coupled to said second means for providing $n$ further threshold voltages respectively equal to predetermined fractions of said first threshold voltage, and means for comparing said purified signals to said further threshold voltages to provide signals indicative of the result of this comparison and means for summing said last mentioned signals.

For a better understanding of the invention and to show how the same may be carried into effect reference will be made to the drawing accompanying the following description and the only figure of which shows one embodiment of the system according to the invention.

The signal to be treated is applied to the input 1 of a delay line 2. An algebraic computer 3, known per se, supplies at its three outputs $S_1$, $S_2$ and $S_3$ three signals resulting from different algebraic combinations. After subtraction in a subtractor 8, of signal $S_1$, detected in a detector 4, and of the signal $S_2$, rectified in a rectifier 5, from each other and after detection in a detector 6 and amplification in an amplifier 9 of the resulting signal, a signal is obtained which is such that echos from point targets are optimized relative to noise signals and the long echos are eliminated. The signal $S_3$ supplies, after double detection in detector 7 and amplification in an amplifier 10, a measure of the mean noise leevel.

All the circuit so far described is known per se and has been described in the above mentioned patent 3,349,395.

According to the invention, the "purified" video signal, i.e., the signal obtained at the output of the amplifier 9, is applied to the inputs of $n$ comparator $C_i$ ($i=1$ to 7 in the drawing, where $n=7$ by way of non-limiting example). The threshold voltage obtained at the output of the amplifier 10 is applied to a chain of $(n+1)$ resistors $R_1$ to $R_8$, which divide the voltage into seven voltages. The voltages thus obtained and spaced according to the desired distribution, are applied to the second inputs of the comparators $C_1$ to $C_7$.

Each comparator delivers a signal of predetermined amplitude each time a "purified" voltage higher than the threshold is applied thereto.

These signals are applied through weighting resistances $R_{11}$ to $R_{17}$ to a summing amplifier $\Sigma$, purified in a filter F, the pass band of which is near to $1/t$, where $t$ is the duration of the radar pulse, and then applied to the indicator $I_n$.

Weighting resistors $R_{11}$ to $R_{17}$ apply to the signals weighting coefficients which are a function of the threshold of corresponding comparator.

The output signals of the comparators $C_1$ to $C_7$ are also applied to position indicator P of a known type.

If the information is to be translated into a binary code, it is passed to a binary coder T which transforms the positional code into a binary code and which is connected to a computer C. In this example, where $n=7$, a three-digit binary code is used.

Of course, the invention is not limited to the embodiments shown and described, Thus it is to be understood that the purified video and the maximum threshold voltage, may be obtained in any known manner. Also the voltage division, the comparison with the threshold voltages, the summation, the coding and the filtering, may be effected in any other manner, the essential feature being that the "purified" video is compared simultaneously with $n$ fractions of the maxium threshold voltage.

What is claimed is:

1. A system for treating output signals of a pulse radar receiver comprising first means for eliminating from said signals echoes whose duration exceeds a predetermined duration, thus providing purified signals, second means for providing a first threshold voltage corresponding to the average noise accompanying said output signals, third means coupled to said second means for providing $n$ further threshold voltages respectively equal to predetermined fractions of said first threshold voltage, and means for comparing said purified signals to said further threshold voltages to provide signals indicative of the result of this comparison and means for summing said last mentioned signals.

2. A system as claimed in claim 1, wherein said comparing means supply signals having one of two predetermined levels according to whether said purified signal has a level higher or lower than said threshold.

References Cited

UNITED STATES PATENTS 3,349,395   10/1967   Carre et al. _____ 343—17.1

RODNEY D. BENNETT, JR., *Primary Examiner.*

CHARLES L. WHITHAM, *Assistant Examiner.*